United States Patent
Huntley et al.

(10) Patent No.: US 10,874,237 B2
(45) Date of Patent: Dec. 29, 2020

(54) DRINK HOLDER ASSEMBLY WITH INTERNAL LIGHTING

(71) Applicant: T-H Marine Supplies, LLC, Huntsville, AL (US)

(72) Inventors: Jeffery William Huntley, Madison, AL (US); Matt Drudge, Warsaw, IN (US)

(73) Assignee: T-H Marine Supplies, LLC, Huntsville, AL (US)

( * ) Notice: Subject to any disclaimer, the term of this patent is extended or adjusted under 35 U.S.C. 154(b) by 1 day.

(21) Appl. No.: 16/418,711

(22) Filed: May 21, 2019

(65) Prior Publication Data

US 2019/0357715 A1    Nov. 28, 2019

Related U.S. Application Data

(60) Provisional application No. 62/675,409, filed on May 23, 2018.

(51) Int. Cl.
| | |
|---|---|
| *A47G 23/03* | (2006.01) |
| *B60N 3/10* | (2006.01) |
| *A47B 13/16* | (2006.01) |
| *A47G 23/02* | (2006.01) |
| *B60Q 3/20* | (2017.01) |
| *F21V 23/00* | (2015.01) |
| *F21Y 113/13* | (2016.01) |
| *B63B 45/04* | (2006.01) |
| *F21Y 115/10* | (2016.01) |

(52) U.S. Cl.
CPC .......... *A47G 23/0309* (2013.01); *A47B 13/16* (2013.01); *A47G 23/0216* (2013.01); *B60N 3/10* (2013.01); *B60Q 3/20* (2017.02); *F21V 23/001* (2013.01); *A47B 2220/0075* (2013.01); *B63B 45/04* (2013.01); *F21Y 2113/13* (2016.08); *F21Y 2115/10* (2016.08)

(58) Field of Classification Search
CPC .. B60Q 3/20; A47G 23/0309; A47G 23/0216; B60N 3/10; A47B 13/16; F21V 23/001
See application file for complete search history.

(56) References Cited

U.S. PATENT DOCUMENTS

| | | | |
|---|---|---|---|
| 7,328,876 B2* | 2/2008 | Jones | B60N 3/107 220/694.1 |
| 8,640,377 B2* | 2/2014 | Baltes | A01K 97/10 43/21.2 |
| 2011/0235354 A1* | 9/2011 | Glazier | B60Q 3/20 362/509 |
| 2018/0042417 A1* | 2/2018 | Brown | G09F 13/00 |

* cited by examiner

Primary Examiner — Joseph L Williams
(74) Attorney, Agent, or Firm — Stephen H. Hall; Bradley Arant Boult Cummings L.L.P.

(57) ABSTRACT

A drink holder assembly is disclosed. In one embodiment, the drink holder assembly includes a drink holder, a ring insert, and at least one lighting device. The ring insert is configured to be inserted into the drink holder. The lighting device(s) are mounted to the ring insert. In this manner, the lighting device provides the light needed so that the user can place a beverage container in the drink holder appropriately when in a poorly lit environment.

20 Claims, 17 Drawing Sheets

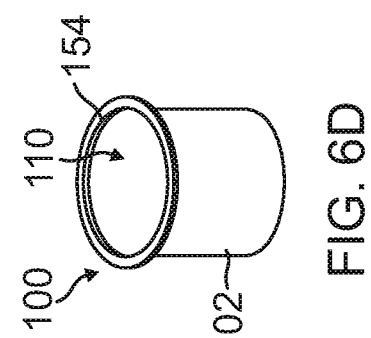
FIG. 6D
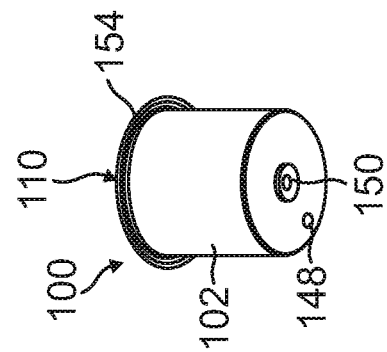
FIG. 6E
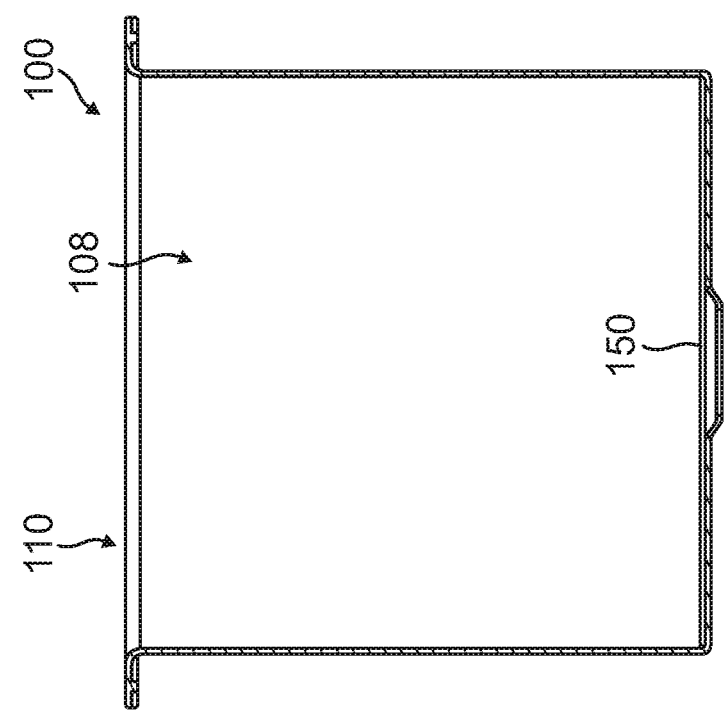
FIG. 6C
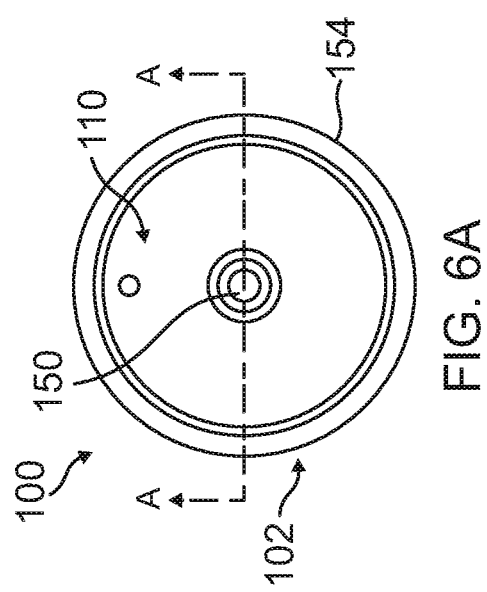
FIG. 6A
FIG. 6B

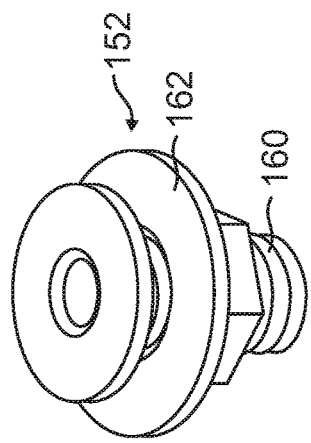
FIG. 10A(5)
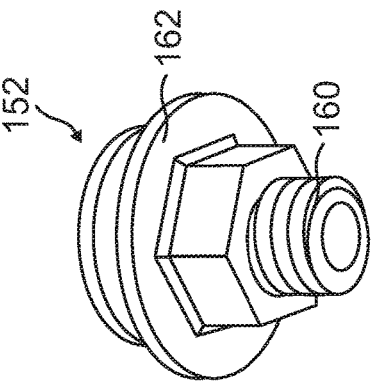
FIG. 10A(6)
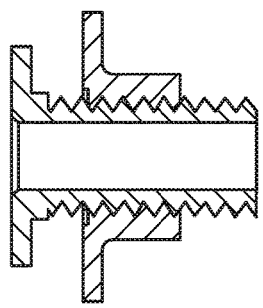
FIG. 10A(4)
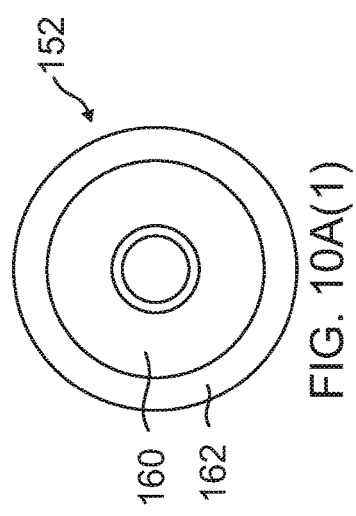
FIG. 10A(1)
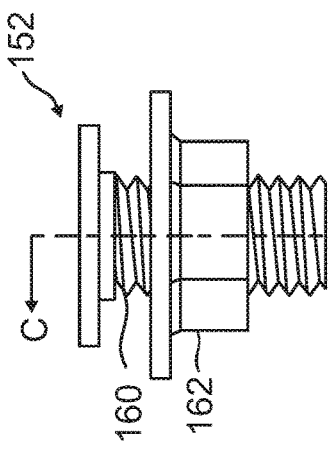
FIG. 10A(2)
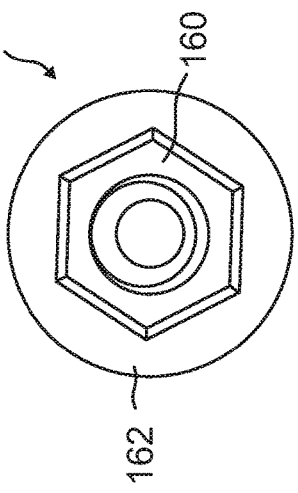
FIG. 10A(3)

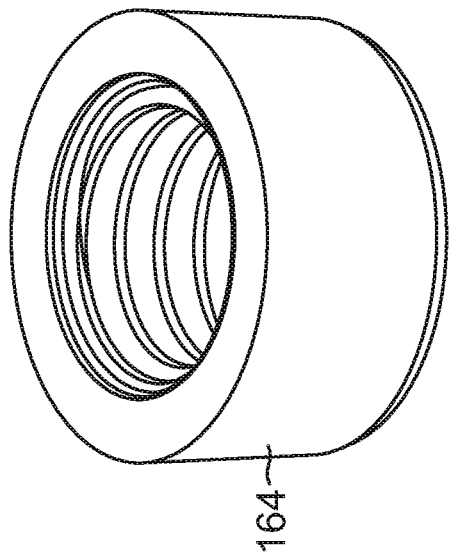
FIG. 10B(3)
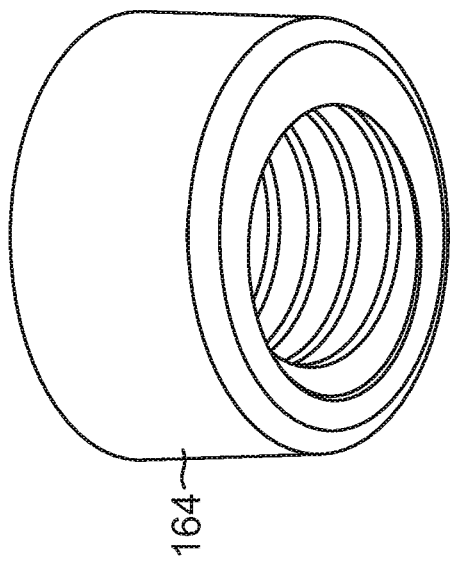
FIG. 10B(4)
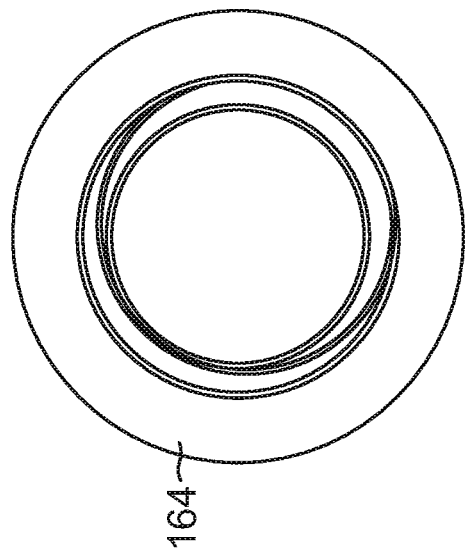
FIG. 10B(1)
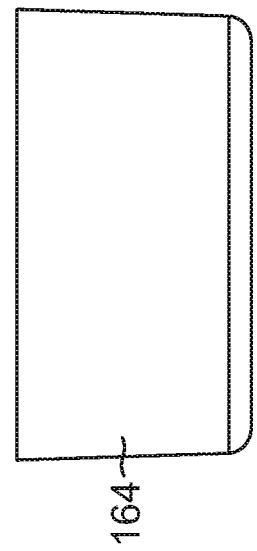
FIG. 10B(2)

DRINK HOLDER ASSEMBLY WITH INTERNAL LIGHTING

This application claims the benefit of provisional patent application Ser. No. 62/675,409, filed May 23, 2018, the disclosure of which is hereby incorporated herein by reference in its entirety.

FIELD OF THE DISCLOSURE

This disclosure relates generally to devices and methods for holding a beverage container.

BACKGROUND

Many cars, trucks, boats, and other recreational vehicles have drink (or beverage) holders built into them so that a user can securely hold a beverage container. These drink holders provide a secure location in a vehicle (e.g., a boat or a car) for holding a beverage container. However, actually locating and positioning a beverage container in the drink holder can be difficult if the surrounding environment is poorly lit. Thus, beverages are often spilled in poorly lit environments due to the user's inability to see the drink holder.

SUMMARY

A drink holder assembly is disclosed. In one embodiment, the drink holder assembly includes a drink holder, a ring insert, and at least one lighting device. The ring insert is configured to be inserted into the drink holder and the lighting device(s) are mounted to, or form a part of, the ring insert. In this manner, the lighting device(s) provide the light needed so that the user can place a beverage container in the drink holder appropriately when in a poorly lit environment.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings, incorporated in and forming a part of this specification, illustrate several aspects of the disclosure, and together with the description serve to explain the principles of the disclosure.

FIG. 1-FIG. 6E illustrate one embodiment of a drink holder assembly.

FIGS. 10A(1)-10A(6) one embodiment of a drain that may be used in the drink holder assembly shown in FIG. 1-FIG. 6E FIG. 10B(1)-10B(4) illustrate one embodiment of a drain cap used in with the drain shown in FIGS. 10A(1)-10A(6).

DETAILED DESCRIPTION

Figure 1:
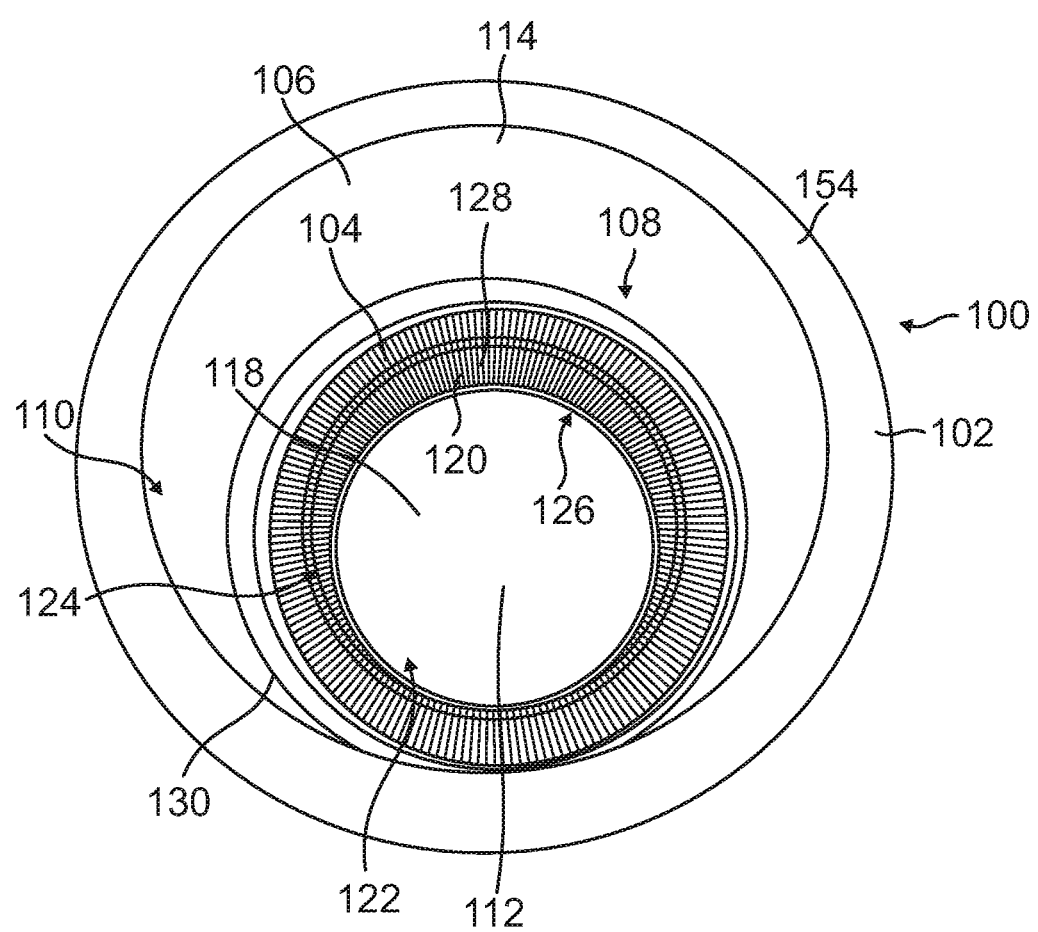
Figure 2:
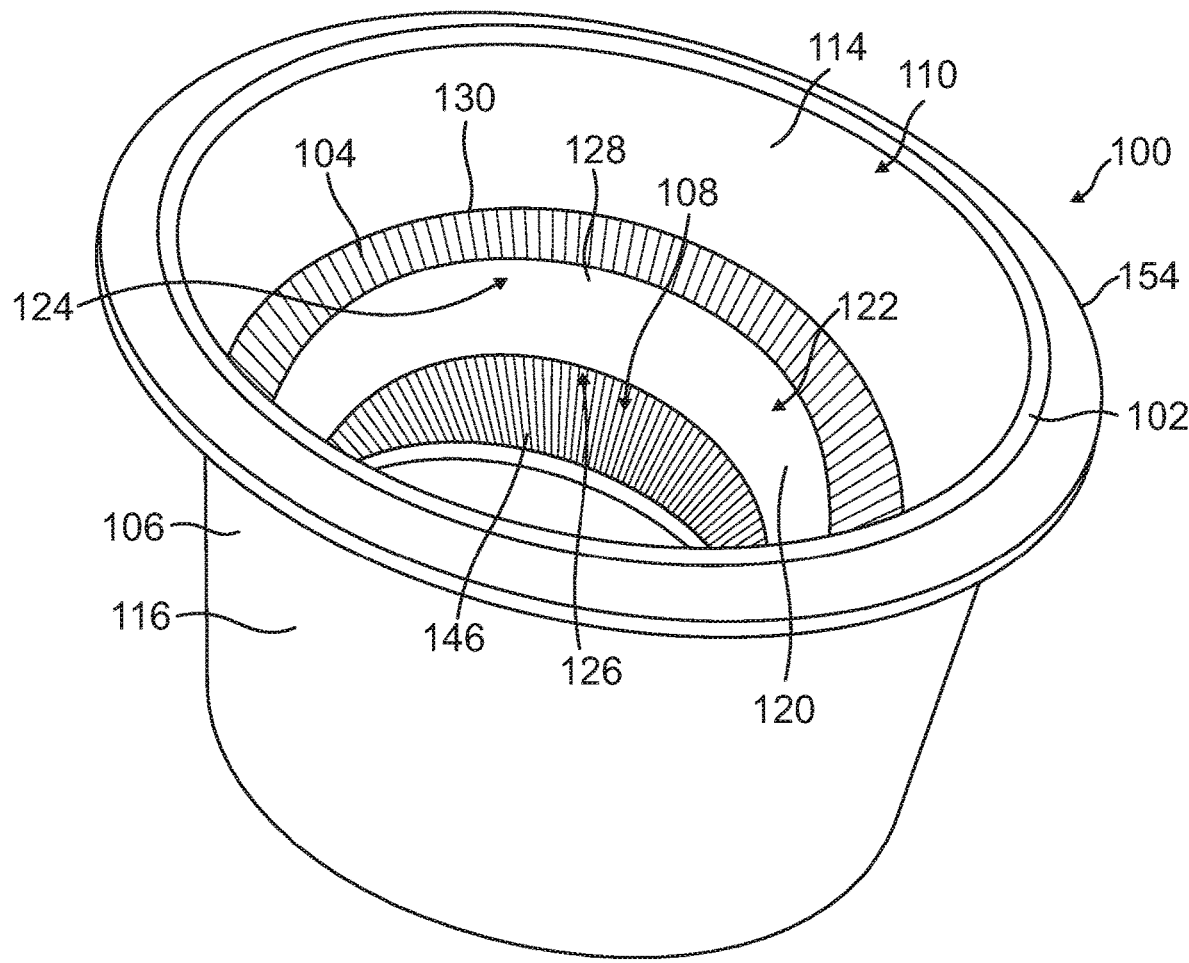
Figure 3:
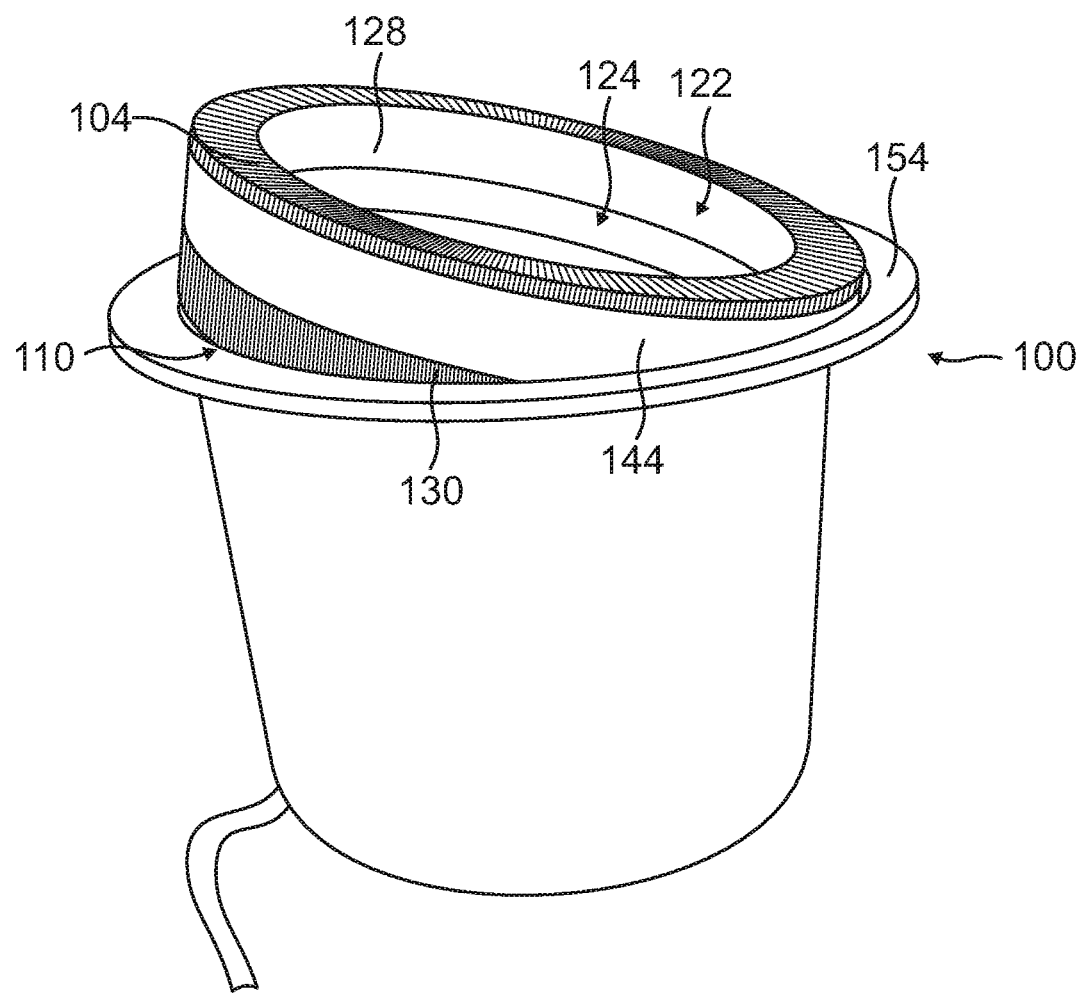
Figure 4:
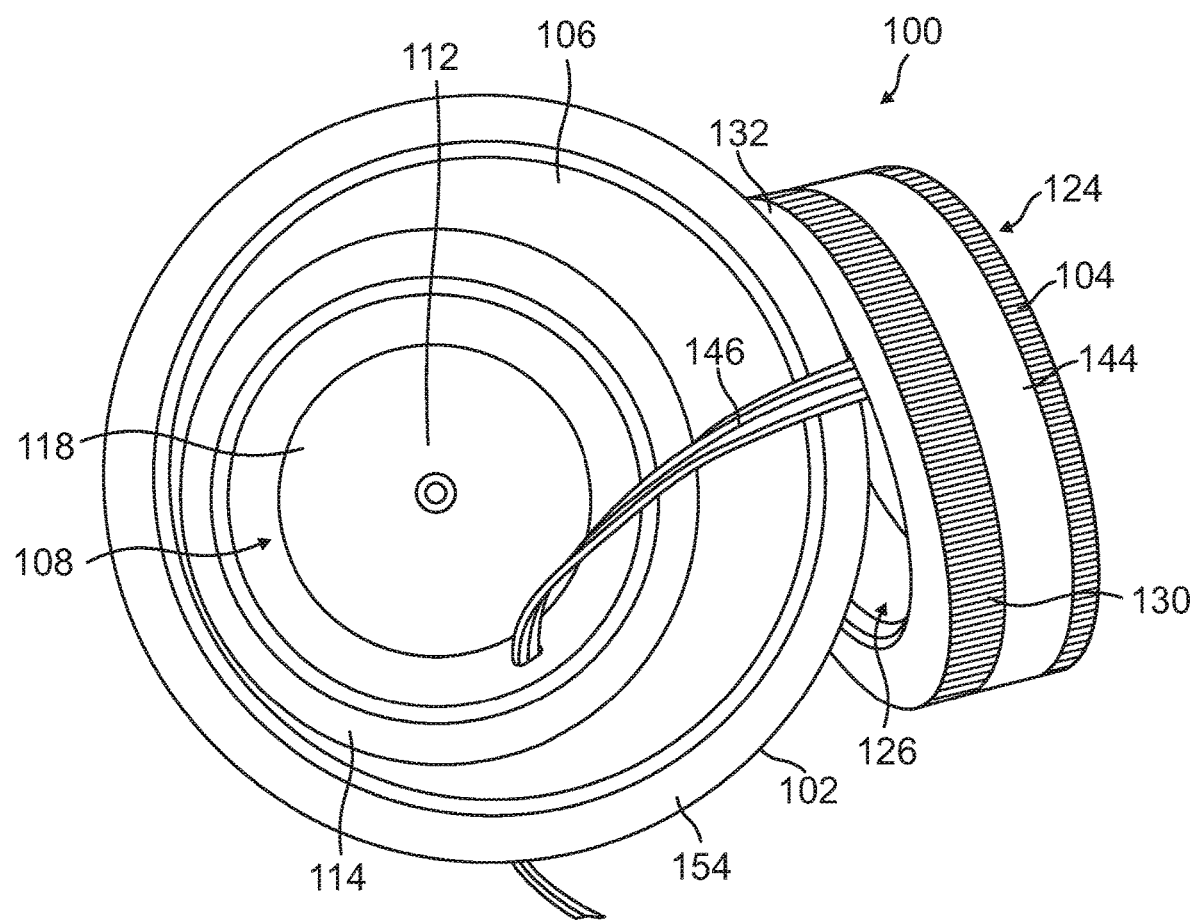

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Throughout this disclosure, relative terminology, such as "approximately," "substantially," "proximate" and the like, may be used in a predicate to describe features and relationships between features of a device or method. The relative terminology in the predicate should be interpreted sensu lato. However, whether the predicate employing the relative terminology is satisfied is determined in accordance to error ranges and/or variation tolerances that are relevant to the predicate and allow the feature or related features described by the predicate to perform their intended function.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

This disclosure relates generally to devices and methods for holding beverage containers. More specifically, embodiments of a drink holder assembly are disclosed which allow for a beverage container to be held securely within a vehicle (e.g., a boat or an automobile), desk, or other structure. As explained in further detail below, the drink holder assembly may include the drink holder, a ring insert, and at least one lighting device. The drink holder may define a cavity for holding a beverage container and the ring insert may be placed within the cavity defined by the drink holder. The lighting device(s) may be mounted on the ring insert and thus may be used to light the cavity of the drink holder when the ring insert is placed in the cavity. In this manner, a user can easily see and place a beverage container in the cavity of the drink holder, even in poorly lit environments. Furthermore, the ring insert may define a support sleeve that is also configured to hold a beverage container. In effect, the ring insert forms a ridge in the drink holder that allows the support sleeve to securely hold drinks with smaller dimensions that the dimensions of the cavity defined by the drink holder. In this manner, the drink holder assembly can be used to hold drinks of different sizes.

While the drink holders specifically disclosed herein have certain shapes and configurations, any type of drink holder may be used so long as the drink holder defines a location for holding the drink. In particular, the drink holders described herein are generally cylindrical in shape. However, drink holders may be provided in any desired shape, such as a rectangular cuboid, a star shape, an elliptical shape, and/or the like. The drink holders may also use two or more shapes at different locations or the same shape (e.g., cylindrical) but with different dimensions (e.g., diameters of 7 cm at the top opening and 9.5 cm at the closed bottom end, or vice versa). The drink holders may also be made of any suitable material including (as a non limiting example), stainless steel and/or a plastic. Furthermore, the drink holder may be configured to be mounted to a vehicle. For example, the drink holder may be mounted in the console of an automobile or boat.

With regards to the ring insert, the ring insert may be any type of insert capable of being mounted inside a drink holder.

The ring insert may be made from any material suitable for mounting one or more lighting devices. In some embodiments, the lighting devices may be mounted inside the ring insert (e.g., inside a passage defined within the ring insert) and thus the material making up the ring insert is at least partially transparent. Thus, the ring insert may be made from a translucent plastic that allows light to pass through it. The lighting device(s) may be any type of device that emits light and can be mounted to or in a ring insert within a drink holder. Thus, the lighting device(s) may be incandescent light bulb(s), florescent light bulb(s), light emitting diode(s) (LEDs), and/or the like. The lighting device(s) can be mounted in any suitable manner. For example, in some embodiments, the lighting devices are arranged so that the light from the lighting devices is directed toward the inside of the support sleeve defined by the ring insert. In other arrangements, the lighting devices may be mounted to a ring insert so that the light is directed out the opening of the drink holder. In some arrangements, the lighting may be mounted so that the light is directed to both locations. These and other arrangements would be apparent to one of ordinary skill in the art in light of this disclosure.

FIG. 1, FIG. 2, FIG. 3, FIG. 4, FIG. 5A-FIG. 5E, and FIG. 6A-FIG. 6E illustrate an example of an exemplary drink holder assembly 100. The drink holder assembly 100 includes a drink holder 102 and a ring insert 104. The drink holder 102 is configured to hold a beverage container. At least one lighting device, such as one or more light emitting diodes (LEDs) are mounted on the ring insert, as explained in further detail below. The ring insert 104 is configured to be mounted in the interior of the drink holder 102. In this manner, the lighting device(s) (e.g., LEDs) mounted in the ring insert 104 can be turned on to emit light thereby allowing a user to see the drink holder assembly 100 in poorly lit environments. Furthermore, as explained in further detail below, the ring insert 104 allows different sized beverage containers to be secured within the drink holder 102.

In this embodiment, the drink holder 102 includes a beverage container receptacle 106. A user can thus insert the beverage container into the beverage container receptacle 106 so that the beverage container is held within the beverage container receptacle 106. More specifically, the beverage container receptacle 106 defines a cavity 108 within the interior of the beverage container receptacle 106 configured to hold the beverage container. The beverage container receptacle 106 furthermore defines an open end 110 at the top of beverage container receptacle 106 for receiving the beverage container into the cavity 108 and a closed bottom end 112 at the bottom of the beverage container receptacle 106. The beverage container receptacle 106 defines an interior surface 114 that in turn defines the cavity 108 in the interior of the beverage container receptacle 106. The beverage container receptacle 106 also defines the exterior surface 116 (See FIG. 2) on the exterior of the beverage container receptacle 106 and oppositely disposed from the interior surface 114.

The ring insert 104 is configured to be mounted such that the ring insert 104 is supported by the closed bottom end 112 of the beverage container receptacle 106. In this embodiment, the drink holder assembly 100 includes a padded wafer 118 that is directly on top of the closed bottom end 112. The padded wafer 118 is configured to muffle audible noise so that a beverage container does not make loud noises when placed in the cavity 108. The padded wafer 118 is optional and may not be provided in alternative embodiments.

The ring insert 104, in this embodiment, is substantially cylindrical and defines a support sleeve 120 configured to support a beverage container that is a different size (smaller) than the beverage container that is supported directly by the drink holder 102. As such, the ring insert 104 has an inner diameter that defines the support sleeve 120, and in particular, a drink aperture 122 that is provided by the support sleeve 120. The inner diameter of the ring insert 104 is less than the inner diameter of the beverage container receptacle 106. The support sleeve 108 furthermore defines an open end 124 at the top of support sleeve 120 for receiving a beverage container into the drink aperture 122 and an oppositely disposed open end 126 at the bottom of the support sleeve 120.

In this embodiment, the ring insert 104 has an outer diameter that is larger than its inner diameter and approximately equal to the inner diameter of the beverage container receptacle 106. The difference between the inner diameter (i.e., the diameter of the drink aperture 122) and outer diameter of the ring insert 104 in this embodiment is approximately 1 cm. Furthermore, in this embodiment, the inner diameter of the ring insert 104 is approximately 7 cm and the outer diameter of the ring insert 104 (and also the diameter of the cavity 108) is approximately 8 cm. Additionally, a height of the ring insert 104 is preferably significantly less than a height of the cavity 108 of the beverage container receptacle 106. In this embodiment, the height of the ring insert 104 is approximately 2 cm and the height of the cavity 108 of the beverage container receptacle 106 is approximately 7.5 cm.

Accordingly, the ring insert 104 effectively forms a ridge within the cavity 108. Thus, the support sleeve 120 defined by the ring insert 104 allows for the drink holder assembly 100 to support different sizes of beverage containers within the drink holder 102. Thus, if the beverage container is too large to fit inside the drink aperture 122 of the support sleeve 120, the beverage container would rest on a top surface of the ring insert 104 and would be secured by the interior surface 114 of the beverage container receptacle 106. However, a beverage container having a diameter less than or equal to the inner diameter of the ring insert 104 would fit in the support sleeve 120 and thus be supported by an interior surface 128 of the support sleeve 120. An exterior surface 130 (See FIG. 3) of the ring insert 104 may engage the interior surface 114 of the beverage container receptacle 106. Furthermore, a bottom surface 132 (See FIG. 4) of the ring insert 104 rests on the closed bottom end 112 of the beverage container receptacle 106.

In this embodiment, the beverage container receptacle 106 is cylindrical and thus so is the ring insert 104. It should be noted that alternative embodiments of the beverage container receptacle 106 and the support sleeve 120 may have any suitable shape depending on the dimensions of the beverage containers that are to be held within the beverage container receptacle 106.

One or more lighting devices (e.g., LEDs) are mounted to, or form a part of, the ring insert 104. In this embodiment, the ring insert 104 is at least partially hollow and defines an interior passage 134 (See FIG. 5B) inside the ring insert 104. The interior passage 134 is defined by an outer passage surface 136 (See FIG. 5B), an inner passage surface 138 (See FIG. 5B), a top passage surface 140 (See FIG. 5B), and a bottom passage surface 142 (See FIG. 5B). In this embodiment, a flexible substrate 144 (See FIG. 4) is attached inside the interior passage 134 to the outer passage surface 136. Various LEDs are mounted to the flexible substrate 144 inside the interior passage 134 and around the outer passage surface 136. The flexible substrate 144 may include wiring to each of the LEDs to provide power and control signals to the LEDs. The LEDs are mounted so that the LEDs are parallel with the outer passage surface 136 and so that the LEDs face toward the drink aperture 122. In this manner, the light emitted from the LEDs has the greatest intensity toward the drink aperture 122.

It should be noted however that in alternative embodiments, the LEDs may be configured to direct light in different directions. For example, in one configuration, the flexible substrate 144 may be attached to the bottom passage surface 142 so that the LEDs face toward the top passage surface 140. This alternative arrangement would direct the light emitted from the LEDs toward the open end 110 and thus the light would have the greatest intensity toward the open end 110 at the top of the beverage container receptacle 106.

The ring insert 104 is made from a material that is at least partially transparent and thus light from the LEDs light the inside of the ring insert 104. This not only allows for the user to easily locate and place their beverage container appropriately in the cavity 108 of the drink holder 102 but also has a pleasant aesthetic effect. In some embodiments, the drink holder 102 is made from a metal such as stainless steel. The padded wafer 118 is preferably circular and preferably has a diameter approximately equal to the inner diameter of the support sleeve 120. The padded wafer 118 rests against the closed bottom end 112 of the cavity 108 and centered so as to be aligned with the drink aperture 122. Thus, the padded wafer 118 muffles the noise from the closed bottom end 112 when a beverage container is placed in the support sleeve 120.

The ring insert 104 also includes wiring 146 that provides power to the LEDs. More specifically, the wiring 146 connects to the wiring inside the flexible substrate 144 and extends out of the interior passage 134. In this embodiment, a subset of the LEDs are configured to emit red light. Thus, a wire with red insulating skin is provided to provide power to these LEDs. A subset of the LEDs are configured to emit blue light. Thus, a wire with blue insulating skin is provided to provide power to these LEDs. Furthermore, a subset of the LEDs are configured to emit green light. Thus, a wire with green insulating skin is provided to provide power to these LEDs. The wires with the red, green, and blue insulating skins may be connected to a power source so that the LEDs within the ring insert 104 are powered and generate light. The wiring 146 also includes a wire with black insulating skin. This wire is configured to provide a ground for the LEDs and wiring in the flexible substrate 144.

Figure 5A:
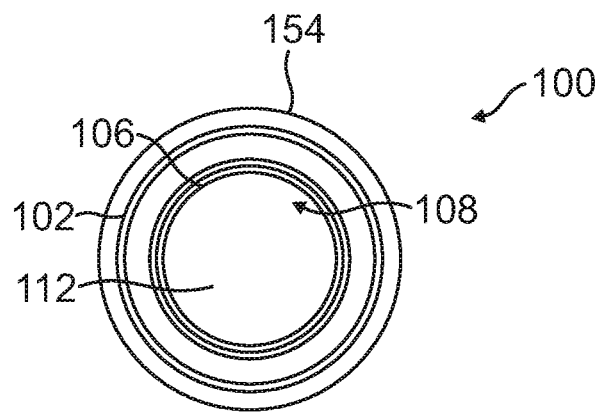
Figure 5B:
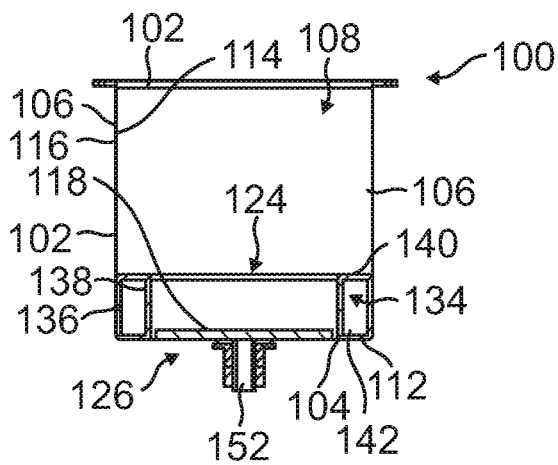
Figure 5C:
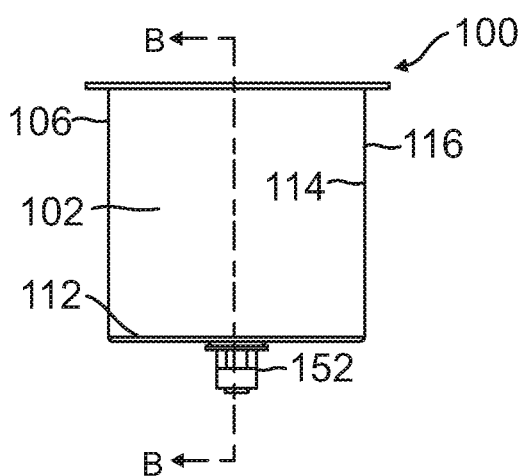
Figure 5D:
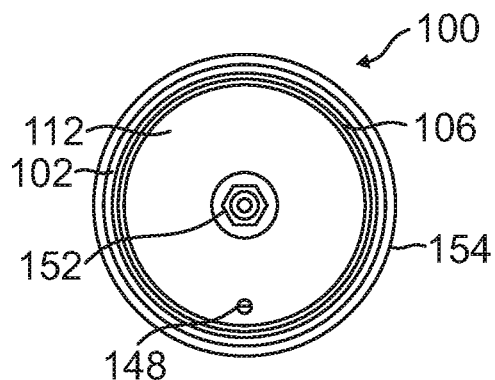
Figure 5E:
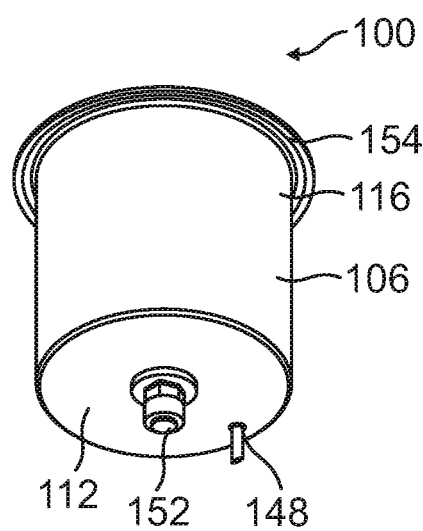

Since the ring insert 104 is placed within the cavity 108, the closed bottom end 112 defines a wiring aperture 148 (See FIG. 5E and FIG. 6E). The wiring aperture 148 is configured to allow the wiring 146 to pass through the wiring aperture 148 so that the wiring 146 can be connected to an external power source and ground. In addition, the closed bottom end 112 defines an optional drain aperture 150 (See FIG. 6A, FIG. 6B, FIG. 6C, FIG. 6E) in the center of the closed bottom end 112. The drink holder assembly 100 includes a drain 152 (See FIG. 5B, FIG. 5C, FIG. 5D, FIG. 5E) that engages the drain aperture 150 and allows for fluids to be drained out of the beverage container receptacle 106.

The drink holder 102 also includes a flange 154 that extends laterally out of the open end 110 of beverage container receptacle 106 past the exterior. The flange 154 may be designed to rest on and be substantially flush with the surface of the structure (e.g. the console of an automobile or boat) that the drink holder 102 is attached to. In this embodiment, the flange 154 has a cross sectional area that is circular. However, in alternative embodiments, the flange 154 may have a cross sectional area of any other suitable shape such as, for example, decorative shapes like a star shape, the shape of a cross, and/or the like.

Figure 7:
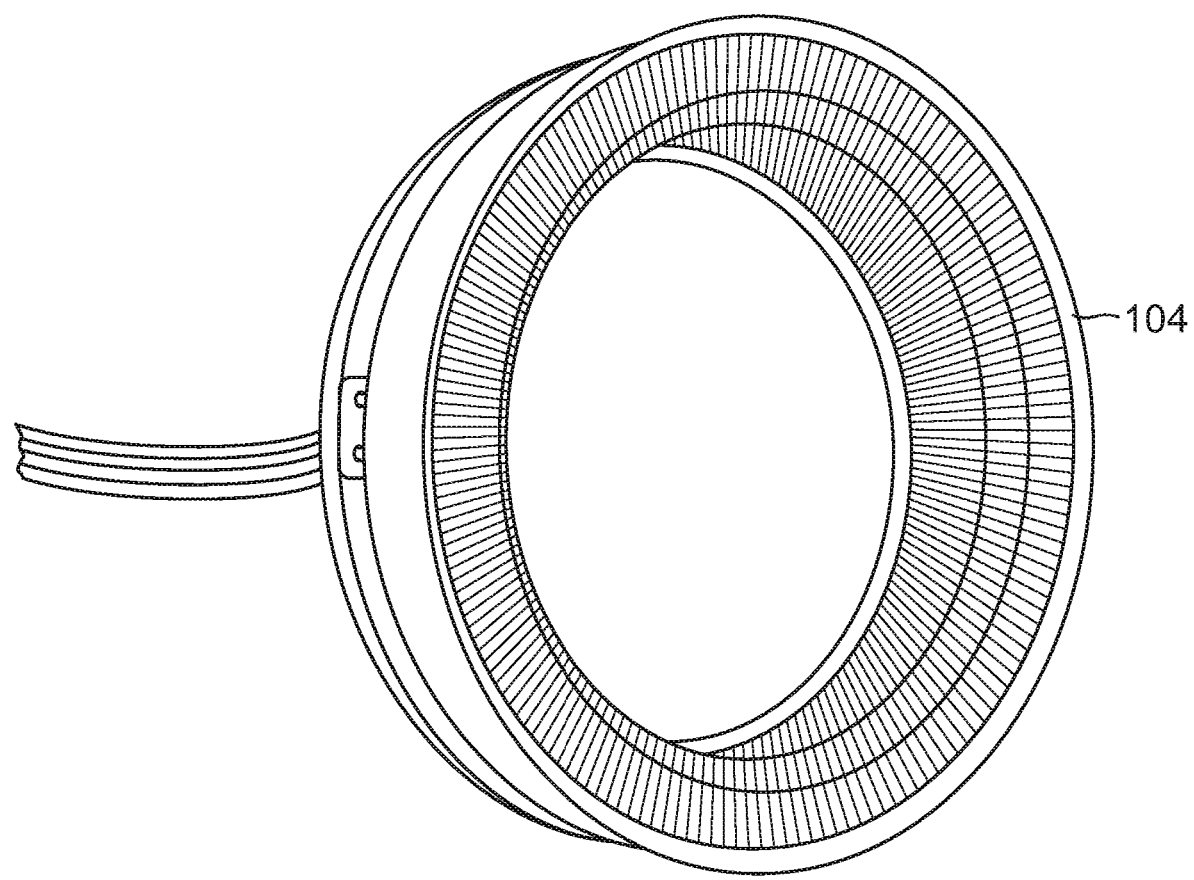
FIGS. 7-8 illustrate one embodiment of the ring insert used in the drink holder assembly shown in FIG. 1-FIG. 6E.
Figure 8:
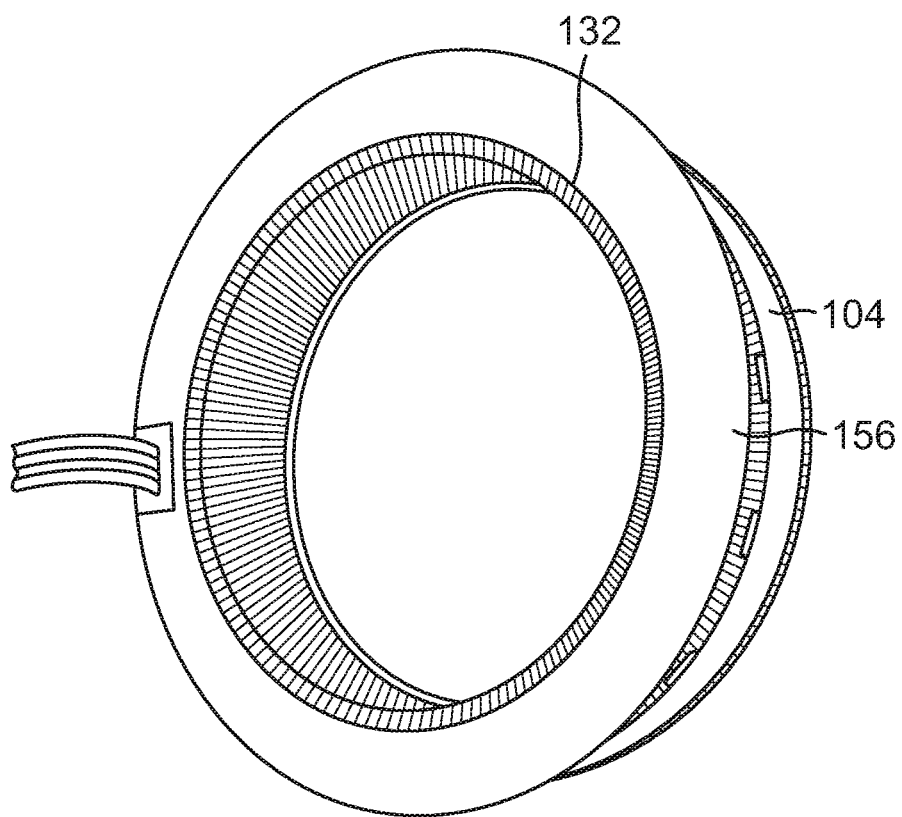

FIG. 7 and FIG. 8 illustrate the embodiment of the ring insert 104 described above. More specifically, FIG. 7 illustrates a top view of the ring insert 104 and FIG. 8 illustrates a bottom view of the ring insert 104. The ring insert 104 may be removable from the beverage container receptacle 106 (shown in FIG. 1-FIG. 6E) and/or may not be mounted inside the cavity 108 (shown in FIG. 1-FIG. 6E) when the drink holder assembly 100 (shown in FIG. 1-FIG. 6E) is sold. In some embodiments, as shown in FIG. 8, an adhesive strip 156 may be attached to the bottom surface 132 thereby allowing the ring insert 104 to attach to the closed bottom end 112 of the beverage container receptacle 106.

Figure 9A:
FIGS. 9A-9C illustrate one embodiment of a padded wafer used in the drink holder assembly shown in FIG. 1-FIG. 6E.
Figure 9B:
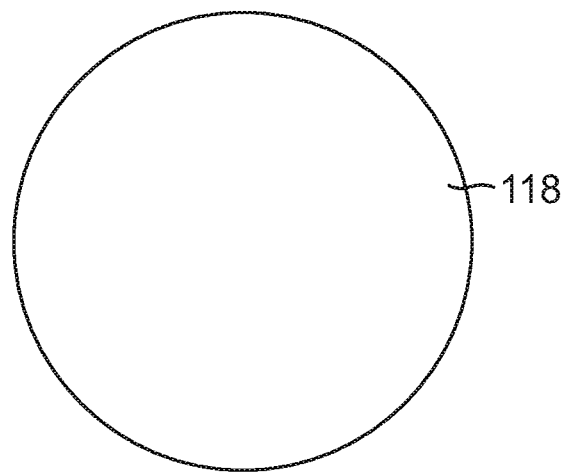
Figure 9C:
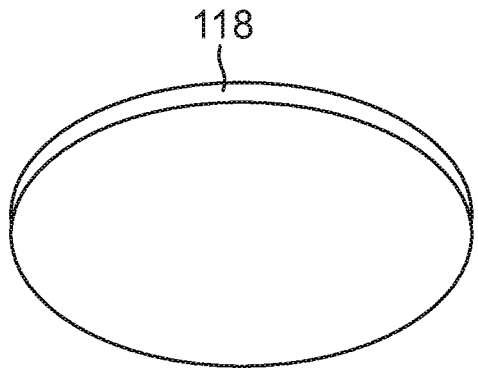

FIGS. 9A-FIG. 9C illustrate one embodiment of the padded wafer 118. In this embodiment, the padded wafer 118 is made from neoprene, which is a material with good sound damping qualities. In this embodiment, the padded wafer 118 is circular however, in other embodiments, the padded wafer 118 may be of any desired shape. Although not explicitly shown in FIGS. 9A-FIG. 9C, the padded wafer 118 may include a central drain aperture that is aligned with the drain aperture 150 (shown in FIG. 6A, FIG. 6B, FIG. 6C, FIG. 6E) and the drain 152 to allow fluids to enter the drain 152 and out of the cavity 108. An adhesive may be provided on a bottom surface of the padded wafer 118 so that the padded wafer 118 attaches to the closed bottom end 112 within the cavity 108.

FIG. 10A(1)-10A(6) illustrates one embodiment of the drain 152. The drain 152 includes a hollow screw 160 and a washer 162. A head of the hollow screw 160 is configured to sit on of the closed bottom end 112 (shown in FIG. 1-FIG. 6E) within the cavity 108 (shown in FIG. 1-FIG. 6E). A threaded member of the hollow screw 160 is inserted through the drain aperture 150 (shown in FIG. 6A, FIG. 6B, FIG. 6C, FIG. 6E) so that the threaded member of the hollow screw 160 extends outside the cavity 108. The washer 162 may then be screwed on the threaded member of the hollow screw 160 that extends outside the cavity 108 so as to secure the drain 152 to the beverage container receptacle 106 (shown in FIGS. 1-6E). In some embodiments, a drain cap (See FIG. 10B(1)-10B(4)) may be provided.

FIG. 10B(1)-10B(4) illustrates the drain cap 164 that may be screwed to the threaded member of the hollow screw 160 below the washer 162. The drain cap 164 may be removed in order to install the drink holder 102 to a supporting structure (e.g. the console of an automobile or boat).

Figure 11:
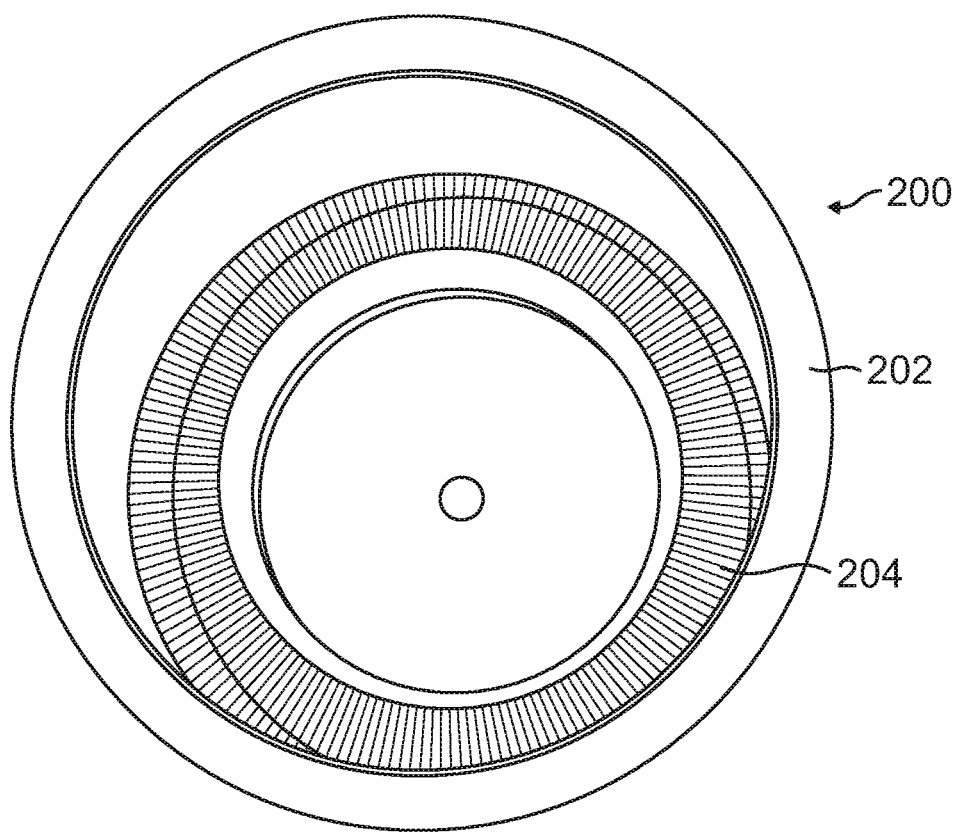
FIGS. 11-13 illustrate still another embodiment of a drink holder assembly.
Figure 12:
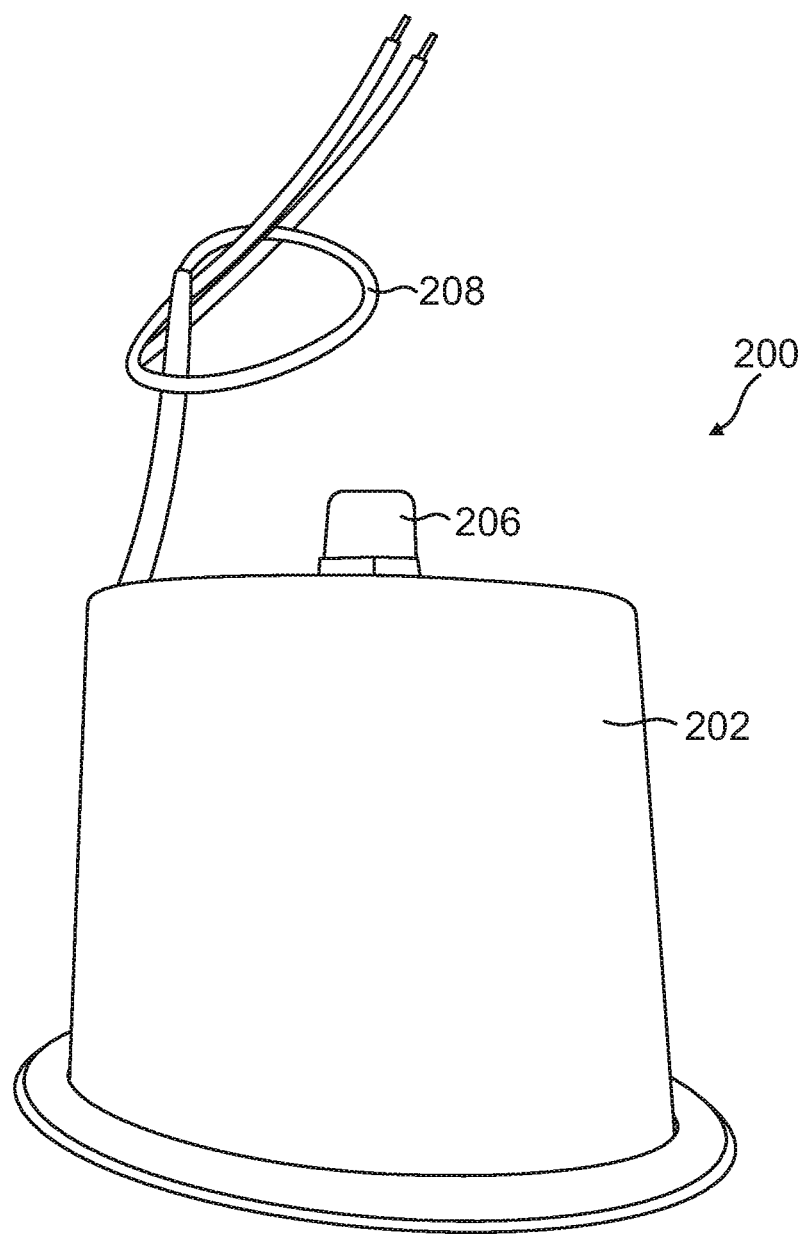
Figure 13:
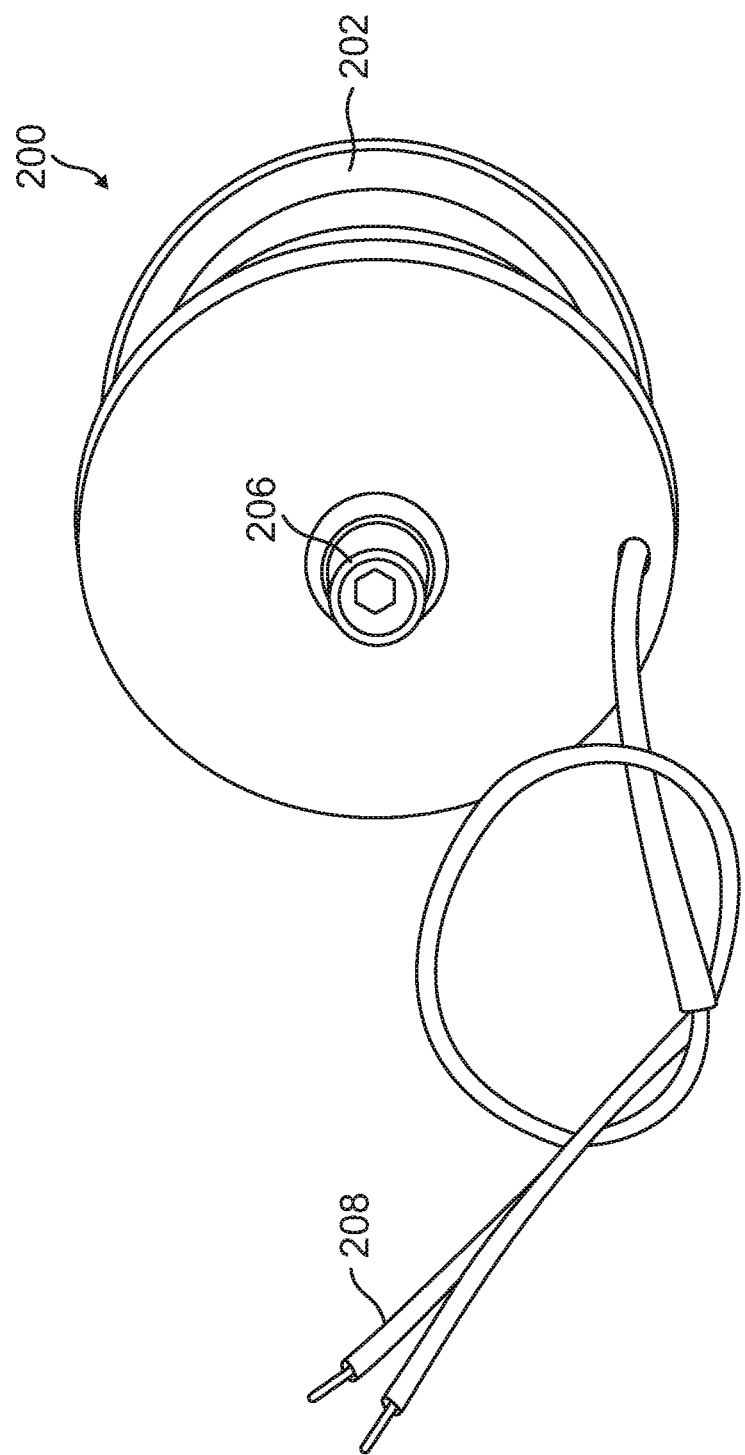

FIG. 11, FIG. 12, and FIG. 13 illustrate another embodiment of a drink holder assembly 200. The drink holder assembly 200 also includes a drink holder 202 and ring insert 204. The drink holder 202 is the same as the drink holder 102 described above, except this embodiment of the drink holder 202 is made from a black plastic. Furthermore, a drain cap 206 is shown attached to the hollow screw 160.

Additionally, the ring insert 204 illustrated in FIGS. 11-13 is the same as the ring insert 104 described above except for the LEDs and the wiring 208. In this embodiment, the LEDs are all configured to emit white light instead of light in various colors (e.g., red, blue, green). Thus, the wiring 208 only needs one wire (wire shown in FIG. 12 and FIG. 13 with the red insulating skin) to power all the LEDs. Like the wiring 146 described above, the wiring 208 also includes a ground wire (the wire shown in FIG. 12 and FIG. 13 with the black insulating skin).

Figure 14:
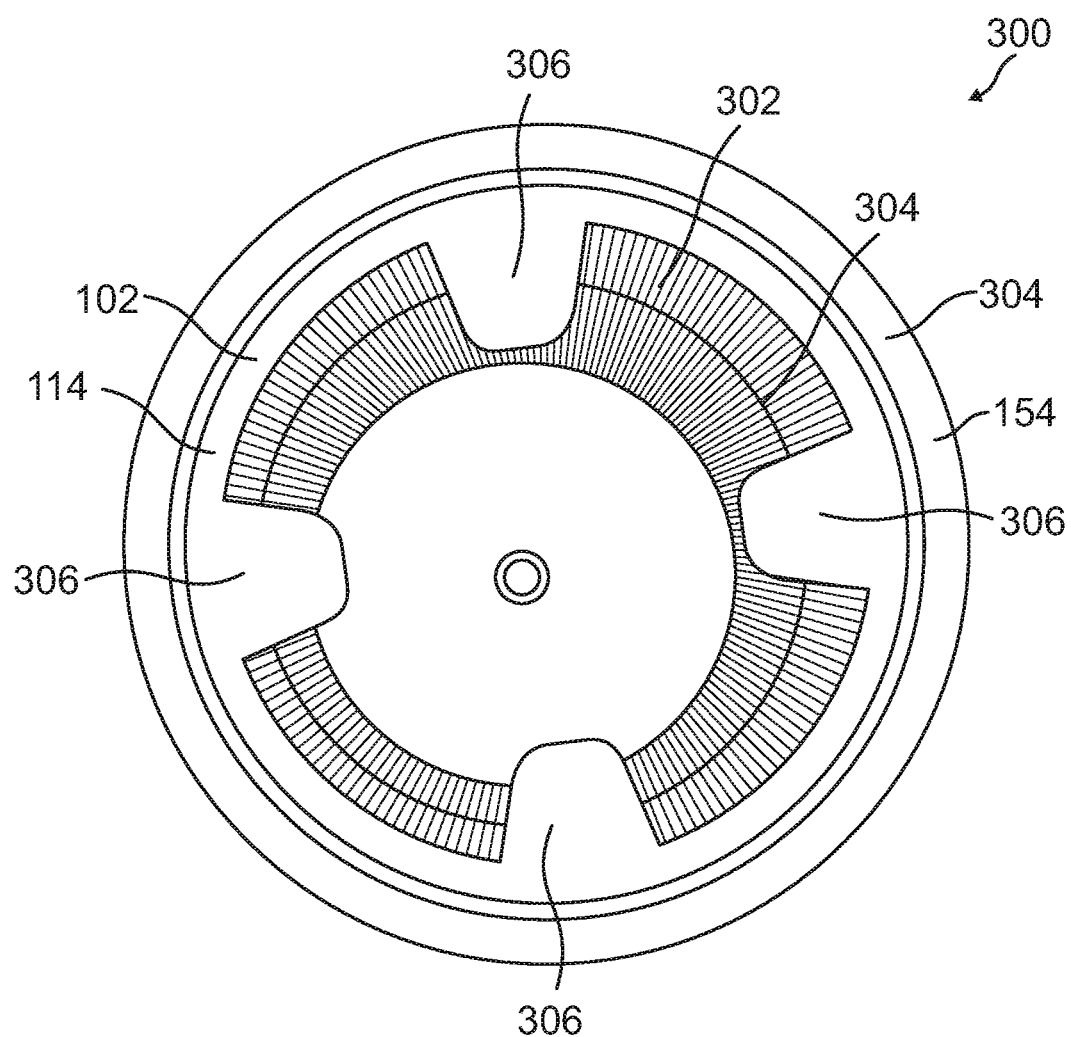
FIG. 14 illustrates yet another embodiment of a drink holder assembly.
Figure 15C:
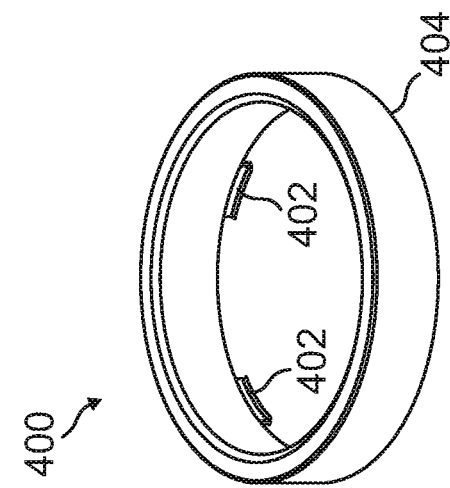
FIG. 15A-15F illustrates another embodiment of a ring insert that may be used in the drink holder assembly shown in FIG. 1-FIG. 6E.
Figure 15F:
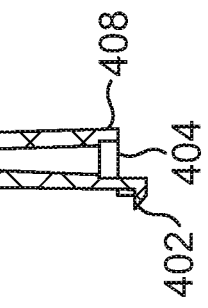
Figure 15B:
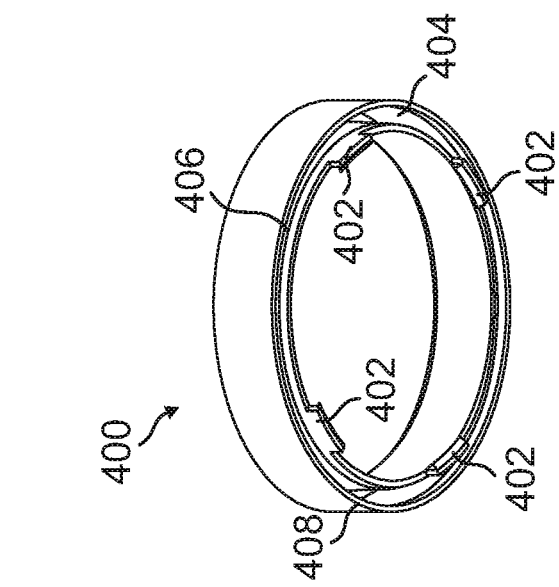
Figure 15E:
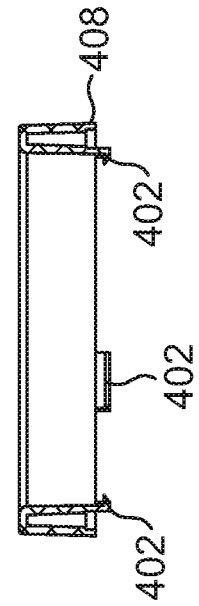
Figure 15A:
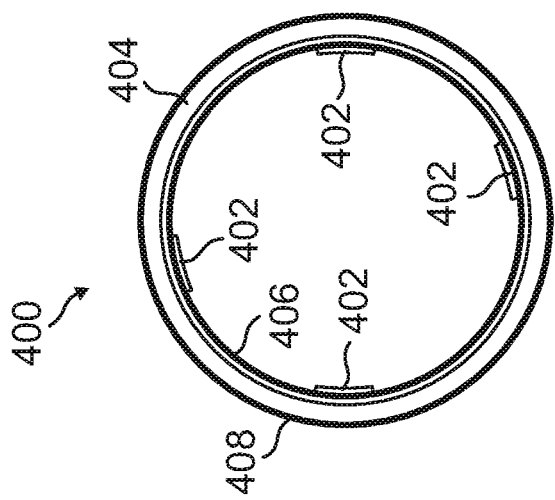
Figure 15D:
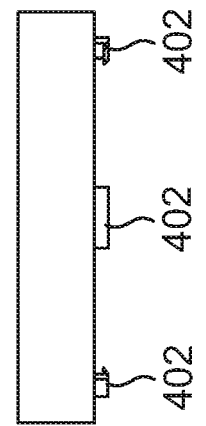

FIG. 14 illustrates still another embodiment of a drink holder assembly 300. The drink holder assembly 300 includes the same drink holder 102 described above with respect to FIG. 1-FIG. 6E. Furthermore, the drink holder assembly 300 includes a ring insert 302 that is the same as the ring insert 204 described above with respect to FIG. 11-13, except in this embodiment the LEDs are all configured to emit red light instead of white light.

Additionally, the drink holder assembly 300 includes another support insert 304, which is another type of ring insert that can be inserted into the beverage container receptacle 106. The support insert 304 has an interior wall configured to hold drink supports 306. The drink supports 306 may be made of flexible, semi-rigid materials that can flex and bend to receive different sized beverages, but keep the beverage relatively secure within the beverage container receptacle 106. These structures could also be incorporated directly into the drink holder 102. Other drink retaining devices and structures can be used as known to those of skill in the art, including wires, collapsible arms, foam, etc. In other alternative embodiments, these drink supports 306 are incorporated directly to the interior surface 114 or the flange 154.

Figure 16B:
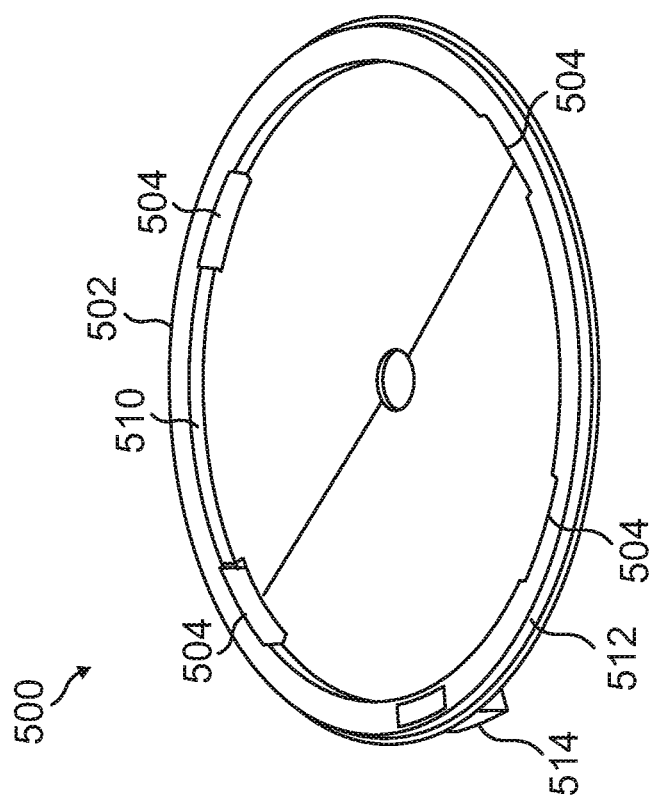
FIG. 16A and FIG. 16B illustrates another embodiment of a padded wafer that may be used in the drink holder assembly shown in FIG. 1-FIG. 6E.
Figure 16A:
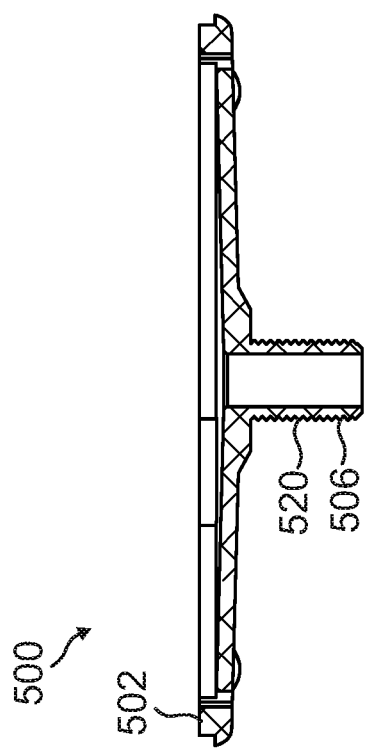

Referring now to FIG. 15A-FIG. 15F and FIG. 16A-FIG. 16B, FIG. 15A-FIG. 15F illustrates another embodiment of a ring insert 400 and FIG. 16A and FIG. 16B illustrates another embodiment of a padded wafer 500. The ring insert 400 is the same as the ring insert 104 described above, except that in this embodiment the ring insert 400 includes ring clips 402 and defines an outer passage 404. More specifically, the ring insert 400 has an inner bottom rim 406 and an outer bottom rim 408. The outer bottom rim 408 has a diameter that is greater than the diameter of the inner bottom rim 406 so as to define the passage 404. The passage 404 extends along the perimeter of the ring insert 400, as shown in FIG. 15A, FIG. 15B, FIG. 15C and FIG. 15F. The ring clips 402 extend vertically downward from the inner bottom rim 406. In this embodiment, there are four ring clips 402 with an angular separation of approximately 90 degrees.

The padded wafer 500 is the same as the padded wafer 118 described above, except that the padded wafer 500 includes a raised rib 502 that defines channels 504 and a drain 506. Thus, the padded wafer 500 is attachable to the closed bottom end 112 at the bottom of the beverage container receptacle 106. As shown in FIG. 16B, the raised rib 502 extends along the outer perimeter of the padded wafer 500 so that a height of the raised rib 502 is above the bottom 508 of the padded wafer 500. The raised rib 502 defines an inner surface 510 and an outer surface 512 such that the diameter to the inner surface 510 is approximately equal to the diameter of the inner bottom rim 406 of the ring insert 400 and the diameter of the outer surface 512 is approximately equal to the diameter of the outer bottom rim 408. As such, the raised rib 502 of the padded wafer 500 fits into the outer passage 404 when the ring insert 400 is connected to the padded wafer 500.

Furthermore, the raised rib 502 defines channels 504. The ring clips 402 of the ring insert 400 are insertable into the channels 504 so as to connect the ring insert 400 to the padded wafer 500. Since the padded wafer 500 is securable to the bottom of the beverage container receptacle 106, the ring insert 400 is thereby securable to the beverage container receptacle 106, in this embodiment, there are four channels 504 with an angular separation of 90 degrees so that the ring clips 402 align with the channels 504 and can thereby be inserted into the channels 504.

As shown in FIG. 16A and FIG. 16B, the padded wafer 500 also includes a drain 506 at the center of the padded wafer 500. The drain 506 is configured to engage the drain aperture 150 at the closed bottom end 112 at the bottom of the beverage container receptacle 106 to allow fluids to be drained from the beverage container receptacle 106. More specifically, the drain 506 includes a hollow screw 520 that is insertable through the drain aperture 150 to extend outside the cavity 108. A washer, such as the washer 162, may be screwed on the hollow screw 520 outside the cavity 108 so as to secure the drain 506 to the beverage container receptacle 106. A wire chase 514 is provided so that wires can be inserted through the padded wafer 500.

Those skilled in the art will recognize improvements and modification to the preferred embodiments of the present disclosure. All such improvements and modifications are considered within the scope of the concepts disclosed herein and the claims that follow.

What is claimed is:
1. A drink holder assembly, comprising:
   a drink holder, comprising a beverage container receptacle that defines a cavity configured to hold a beverage container;
   a ring insert configured to be inserted into the drink holder, wherein the beverage container receptacle has open end that leads into the cavity and a closed bottom end of the cavity, wherein the ring insert is mounted such that the ring insert is supported by the closed bottom end of the beverage container receptacle; and
   at least one lighting device mounted to the ring insert, wherein the at least one lighting device extends substantially along a circumference of the ring insert and wherein the at least one lighting device is configured to direct light toward an inside of the ring insert.
2. The drink holder assembly of claim 1, further comprising a padded wafer on the closed bottom end of the beverage container receptacle, wherein the padded wafer is configured to muffle audible noise.
3. The drink holder assembly of claim 1, wherein the ring insert defines a support sleeve configured to support a second beverage container that is of a different size than the beverage container.
4. The drink holder assembly of claim 1, wherein:
   the ring insert is substantially cylindrical and defines a first inner diameter that defines a support sleeve;
   the beverage container receptacle defines a second inner diameter; and
   the first inner diameter of the support sleeve is less than the second inner diameter of the beverage container receptacle.
5. The drink holder assembly of claim 4, wherein the ring insert has an outer diameter that is larger than the first inner diameter and approximately equal to the second inner diameter of the beverage container receptacle.

6. The drink holder assembly of claim 1, wherein:
the cavity defines a first height;
the ring insert defines a second height is less than the first height of the cavity.

7. The drink holder assembly of claim 1, further comprising a flexible substrate, wherein:
the ring insert is at least partially hollow to define an interior passage;
the flexible substrate is attached inside the interior passage; and
the at least one lighting device are mounted to the flexible substrate.

8. The drink holder assembly of claim 7, wherein the interior passage defines an outer passage surface and the flexible substrate is attached to the outer passage surface.

9. The drink holder assembly of claim 7, wherein the interior passage defines a bottom passage surface and a top passage surface, wherein the flexible substrate is attached to the bottom passage surface so that the at least one lighting device faces toward the top passage surface.

10. The drink holder assembly of claim 7, further comprising wiring that extends out of the interior passage, wherein:
the at least one lighting device comprises a first light emitting diode that emits light of a first color and a second light emitting diode that emits light of a second color;
the wiring includes a first wire to power the first light emitting diode that emits light of the first color; and
the wiring includes a second wire to power the second light emitting diode that emits light of the second color.

11. The drink holder assembly of claim 1, further comprising a padded wafer, wherein:
the ring insert is substantially cylindrical and defines a first inner diameter that defines a support sleeve;
the padded wafer is attached to the closed bottom end of the beverage container receptacle; and
the padded wafer is circular and defines a second diameter that is approximately equal to the first inner diameter of the ring insert.

12. The drink holder assembly of claim 1, further comprising a drain, wherein:
the beverage container receptacle defines a drain aperture;
the drain engages the drain aperture to allow for fluids to be drained out of the beverage container receptacle.

13. The drink holder assembly of claim 12, wherein the drain comprises:
a hollow screw that defines a threaded member, wherein the threaded member is inserted into the drain aperture;
a washer that is screwed on the threaded member to secure the hollow screw to the beverage container receptacle.

14. The drink holder assembly of claim 1, further comprising a flange, wherein the flange extends laterally out of the open end of the beverage container receptacle pas an exterior of the beverage container receptacle.

15. The drink holder assembly of claim 1, further comprising a wafer, wherein:
the beverage container receptacle defines a drain aperture; and
the wafer has a drain that engages the drain aperture to allow fluids to be drained out of the beverage container.

16. A drink holder assembly, comprising:
a drink holder comprising a beverage container receptacle that defines a cavity configured to hold a beverage container, wherein the beverage container receptacle has open end that leads into the cavity and a closed bottom end of the cavity, the beverage container receptacle having a first inner diameter and a first height;
a ring insert that is supported by the closed bottom end of the cavity, the ring insert having a second outer diameter and a second height, wherein the second outer diameter of the ring insert is approximately equal to the first inner diameter of the beverage container receptacle and the second height of the ring insert is less than the first height of the beverage container receptacle; and
at least one lighting device mounted to the ring insert, wherein the at least one lighting device extends substantially along a circumference of the ring insert and wherein the at least one lighting device is configured to direct light toward an inside of the ring insert.

17. The drink holder assembly of claim 16, further comprising a padded wafer on the closed bottom end of the beverage container receptacle, wherein the padded wafer is configured to muffle audible noise.

18. The drink holder assembly of claim 16, wherein the ring insert defines a support sleeve configured to support a second beverage container that is of a different size than the beverage container.

19. A drink holder assembly, comprising:
a drink holder comprising a beverage container receptacle that defines a cavity configured to hold a beverage container, wherein the beverage container receptacle has open end that leads into the cavity and a closed bottom end of the cavity, the closed bottom end of the cavity defining a drain aperture;
a ring insert that is supported by the closed bottom end of the cavity;
a drain that engages the drain aperture to allow fluids to be drained out of the beverage container; and
at least one lighting device mounted to a flexible substrate, wherein the at least one lighting device is configured to provide substantially continuous and substantially uniform illumination along a circumference of the ring insert.

20. The drink holder assembly of claim 19, wherein:
the ring insert is at least partially hollow to define an interior passage; and
the flexible substrate is attached inside the interior passage.

* * * * *